(12) United States Patent
Haruna

(10) Patent No.: US 7,255,195 B2
(45) Date of Patent: Aug. 14, 2007

(54) STEERING DEVICE FOR SNOWMOBILE

(75) Inventor: Kaoru Haruna, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 21 days.

(21) Appl. No.: 10/744,579

(22) Filed: Dec. 22, 2003

(65) Prior Publication Data
US 2004/0173397 A1 Sep. 9, 2004

(30) Foreign Application Priority Data
Dec. 20, 2002 (JP) ............................. 2002-369858

(51) Int. Cl.
B62D 55/00 (2006.01)

(52) U.S. Cl. ..................... 180/906; 180/209; 180/9.48; 280/638

(58) Field of Classification Search ................ 180/182, 180/209, 906, 9.48, 414; 280/28.15, 638
See application file for complete search history.

(56) References Cited

U.S. PATENT DOCUMENTS

| 2,589,602 | A | * | 3/1952 | Clark | 280/13 |
| 2,911,229 | A | * | 11/1959 | Strehlow | 280/638 |
| 3,321,211 | A | * | 5/1967 | Bryant et al. | 280/13 |
| 3,504,752 | A | * | 4/1970 | Milward | 180/190 |
| 3,765,498 | A | * | 10/1973 | Rogerson | 180/190 |
| 3,782,491 | A | * | 1/1974 | Herbenar | 180/435 |
| 4,079,807 | A | * | 3/1978 | Hornagold et al. | 180/414 |
| 4,109,747 | A | * | 8/1978 | Hornagold et al. | 180/414 |
| 4,319,656 | A | | 3/1982 | Kobayashi | 180/182 |
| 4,350,222 | A | * | 9/1982 | Lutteke et al. | 180/209 |
| 4,361,339 | A | | 11/1982 | Kobayashi | 280/21.1 |
| 4,364,447 | A | | 12/1982 | Yoshida | 180/182 |
| 4,372,567 | A | | 2/1983 | Yasui et al. | 280/21.1 |
| 4,374,591 | A | | 2/1983 | Kobayashi | 280/21.1 |
| 4,591,173 | A | | 5/1986 | Marier | 280/21.1 |
| 4,593,921 | A | | 6/1986 | Marier | 280/21.1 |
| 4,688,817 | A | | 8/1987 | Marier | 280/278 |
| 4,690,234 | A | | 9/1987 | Takada | 180/182 |
| 5,660,245 | A | | 8/1997 | Marier et al. | 180/190 |
| 6,139,045 | A | * | 10/2000 | Vandenbark et al. | 280/638 |
| 6,206,125 | B1 | * | 3/2001 | Weddle | 180/209 |
| 6,311,798 | B1 | * | 11/2001 | Anderson | 180/182 |

FOREIGN PATENT DOCUMENTS

| JP | 2000-043735 | 2/2000 |
| JP | 2003-237681 | 8/2003 |
| WO | WO 95/17327 A1 | 6/1995 |

OTHER PUBLICATIONS

European Search Report from Corresponding European Application No. EP 03 02 7783, Search Completed Mar. 27, 2007, Munich, Germany.

* cited by examiner

Primary Examiner—Lesley D. Morris
Assistant Examiner—Daniel Yeagley
(74) Attorney, Agent, or Firm—Knobbe, Martens, Olson & Bear, LLP

(57) ABSTRACT

An adjustable ski track width mechanism allows adjusting the ski track between a narrow ski track width and a wide ski track width. The adjustable ski track width mechanism includes a steering mechanism that provides correct steering geometry and corresponding steering characteristics regardless of the narrow ski track width or the wide ski track width. The adjustable ski track width mechanism can be adjusted by the operator or automatically depending on operator preference or terrain conditions.

18 Claims, 8 Drawing Sheets

STEERING DEVICE FOR SNOWMOBILE

PRIORITY INFORMATION

This application is based on and claims priority to Japanese Patent Application No. 2002-369858, filed Dec. 20, 2002.

BACKGROUND OF THE INVENTION

1. Field of the Invention

The present invention generally relates to a track width and steering mechanism for vehicles. More particularly, the present invention relates to adjusting a track width of snow vehicle skis without significantly changing steering characteristics.

2. Description of the Related Art

The use of snowmobiles and similar snow vehicles has increased in popularity in recent years. These vehicles are being used both for utilitarian purposes and for sport and recreational purposes. The vehicles typically are adapted to travel across snow and/or ice and usually include two forward facing skis along with a driven belt track or other propulsion mechanism, e.g., wheels.

Snowmobiles are controlled through the use of weight shifting and steering movement of the front steering skis. A wide ski track (i.e., a distance between the skis) offers greater stability and ease of use. A narrow ski track offers a more nimble and exhilarating ride. For example, when operating the snowmobile in a relaxed atmosphere or when carrying a passenger, the operator may prefer a more stable, comfortable ride. However when the operator wants to operate the snowmobile on a racetrack or when the operator wants to bank the snowmobile much like a motorcycle or maneuver tight corners, the operator may prefer a narrower ski track.

SUMMARY OF THE INVENTION

A need therefore exists for a snow mobile with an improved versatility that offers an adjustable ski-track without meaningfully sacrificing steering characteristics. In accordance with some of the advantages of the present design, the adjustable ski-track improves handling and enjoyment in a wide variety of snow conditions. The adjustable ski-track mechanism can include a larger ski-track for increased stability and ease of use and a smaller ski-track for a more nimble, improved steering response.

Accordingly, one aspect of the present invention involves a vehicle comprising two support members. The two support members are spaced apart from each other so as to define a track width between the support members. An adjustable support member mechanism is coupled to at least one of the support members and is movable between at least first and second positions so as to change the track width, thereby establishing a first track position and a second track position, respectfully. The first track position defines a first distance between the two support members and the second track position defines a second larger distance between the two support members. A steering mechanism is arranged between a steering input device and the support members to change the direction of the support members according to a position of the steering input device at least when the support members are in the first track position and when the support members are in the second track position.

Another aspect of the present invention involves a method for controlling a support member track width of a vehicle. The method comprises the steps of selecting between a first track width position and a second track width position depending upon a desired operational mode of the vehicle, and causing the support members to move relative to each other to effect the movement between track width positions. With the movement of the support members, a steering mechanism is adjusted between a first steering linkage geometry that corresponds to the first track width position and a second steering linkage geometry that corresponds to the second track width position.

BRIEF DESCRIPTION OF THE DRAWINGS

The above-mentioned and other features of the invention will now be described with reference to the drawings of the embodiments of the present steering device in the context of a snow mobile. The illustrated embodiments of the steering device are intended to illustrate, but not to limit, the invention. The drawings contain the following figures.

DETAILED DESCRIPTION

Figure 1:
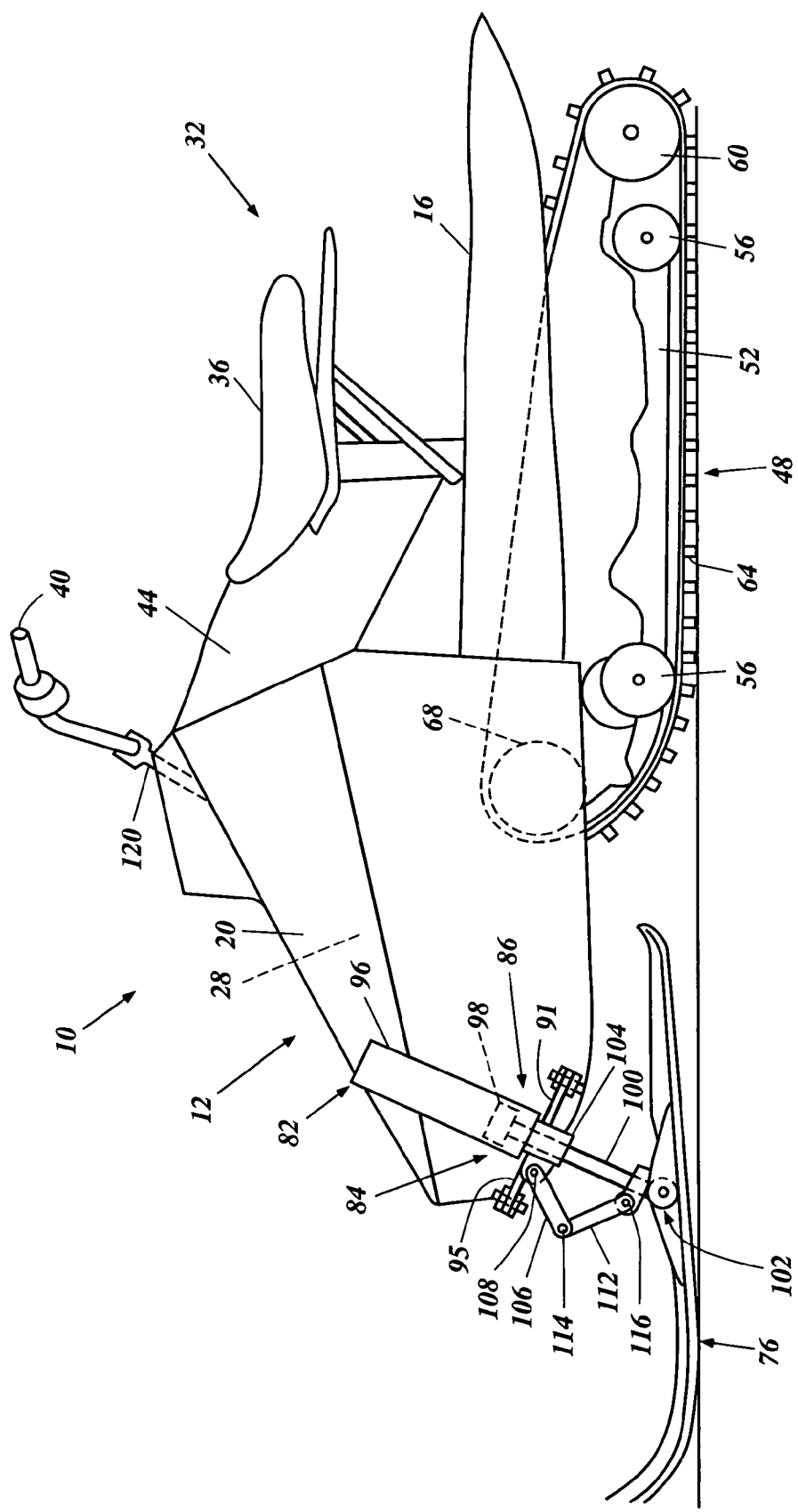
FIG. 1 is a side elevational view of a snowmobile having a pair of steering skis and an adjustable ski-track mechanism arranged and configured in accordance with certain features, aspects and advantages of the present invention.
Figure 2:
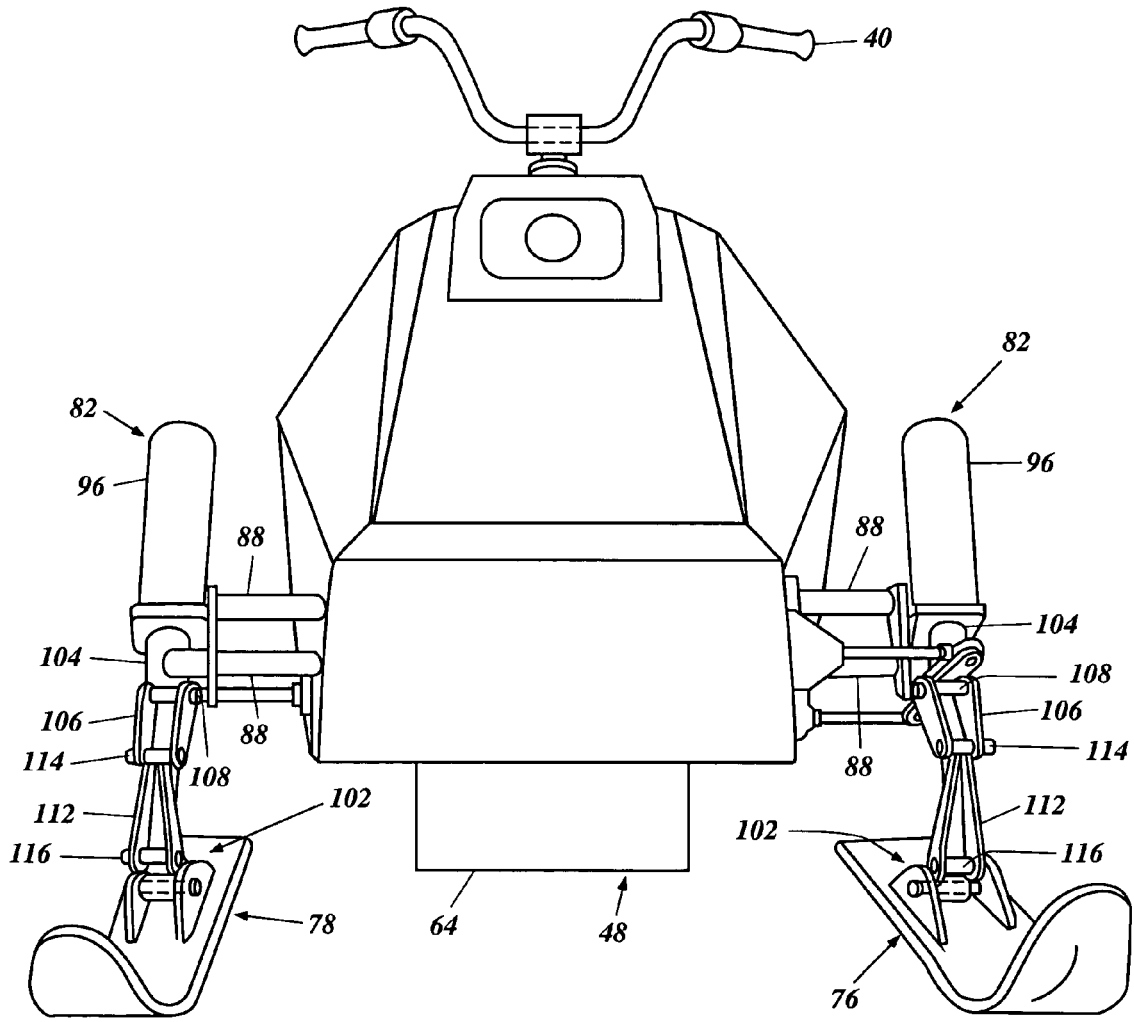
FIG. 2 is a front elevational view of the snowmobile of FIG. 1.
Figure 3:
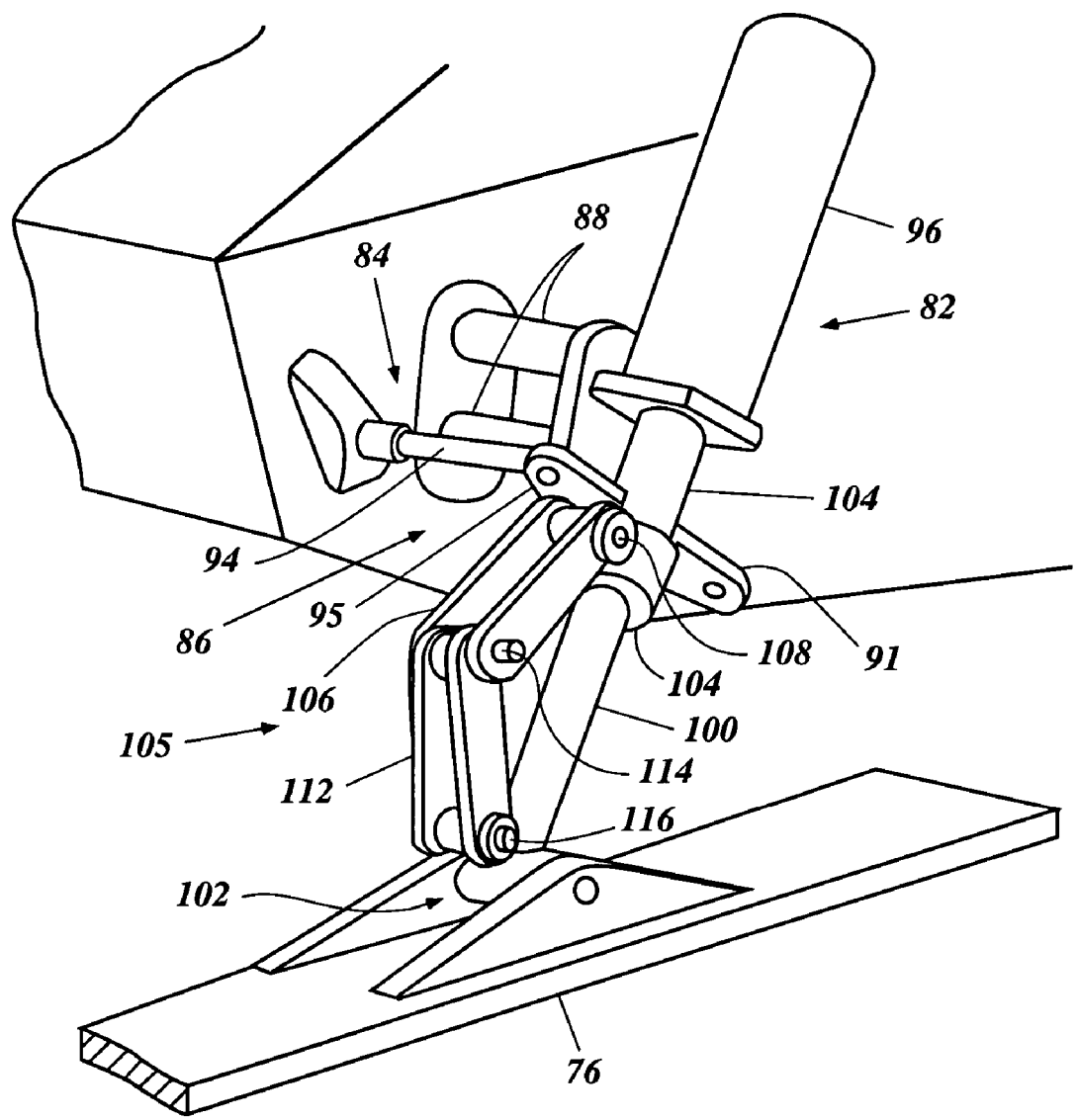
FIG. 3 is a perspective view of a left side front suspension illustrating a portion of the adjustable ski-track mechanism that is positioned outside of a snowmobile body assembly.

With reference initially to FIGS. 1–3, a snowmobile having a pair of adjustable track steering skis constructed in accordance with an embodiment of the present invention is identified generally by the reference numeral 10. While described in the context of a snowmobile, it should be readily appreciated that the present invention also can be used with a variety of other vehicle types (e.g., with wheeled vehicles). The snowmobile 10 includes a body assembly 12. The illustrated body assembly 12 includes a frame 16 and an engine shroud 20. The engine shroud 20 is connected to the frame 16. The engine shroud 20 defines an engine compartment 28 that preferably houses an internal combustion engine (not shown) including at least one cylinder for powering the snowmobile 10.

A cylinder block and cylinder head assembly desirably form the cylinders of the engine. A piston reciprocates within each cylinder of the engine. The pistons drive an output shaft as the pistons reciprocate. A connecting rod links the corresponding piston to a crankshaft of the engine, which is drivingly connected to the output shaft. The corresponding cylinder bore, piston and cylinder head of each cylinder forms a variable volume chamber, which at a minimum volume defines a combustion chamber.

The crankshaft desirably is journaled within a crankcase that, in one embodiment, is formed between a crankcase member and a lower end of the cylinder block. Where the engine is a two-stroke engine, individual crankcase chambers of the engine are formed within the crankcase by dividing walls and sealing disks, and are sealed from one another with each crankcase chamber communicating with a dedicated variable volume chamber.

The engine includes an air induction system to provide air to the combustion chambers of the engine. An intake silencer (not shown) is connected to a plenum chamber (not shown) through a conduit. The plenum chamber communicates with the combustion chambers through at least one intake passage. Desirably, each combustion chamber of the engine communicates with the plenum chamber through a dedicated intake passage.

Many known systems exist for controlling the amount of induction air flowing into an engine. For example, the induction system can include a throttle body assembly having a throttle valve configured to control or "meter" an amount of air flowing through the induction system into the engine. Different types of throttling mechanisms are possible such as, but not limited to a butterfly valve, a knife valve, or a sliding valve, etc. Where the engine operates on a four-stroke principle, the engine can include variable intake valve timing and/or duration. Such valves can work in cooperation with a throttle body assembly to control an amount of air flowing into the engine. Alternatively, such a valve system can be configured to control the air amount without a throttle body. Such systems can receive a power request input from the operator through direct mechanical connection or through electronic communication. The throttling mechanism can be controlled by an electric motor either through a direct connection or through a remote connection.

The engine also includes an exhaust system to transfer exhaust gases from the combustion chambers to a location outside of the engine compartment 28. An exhaust passage (not shown) communicates with each combustion chamber and extends toward a rearward end of the snowmobile 10.

A charge former (e.g., a carburetor or a fuel injector) of the induction system communicates with an inlet end of the intake passage. The charge former receives fuel from the fuel tank and produces the fuel charge which is delivered to the cylinders in a known manner. Alternatively, fuel can be supplied directly into the combustion chamber rather than through the induction system. Because additional internal details of the engine and the induction and exhaust systems desirably are conventional, a further description of the engine construction is not believed necessary to understand and practice the present adjustable ski track and steering device.

The illustrated body assembly 12 further includes a rear portion 32 that accommodates a seat 36, which is adapted to seat one or more riders in a straddle fashion. A handlebar assembly 40 is positioned in front of the seat 36 for operation by the rider. A fuel tank 44 is positioned generally between the handlebar assembly 40 and the seat 36.

The illustrated engine shroud 20 includes a raised portion located in front of the handlebar assembly 40. The raised portion carries a windshield (not shown), which generally protects the rider operating the snowmobile 10 from wind, snow, branches and other objects.

A carriage assembly 48 is supported at the rear portion 32 of the body 12 below the seat 36 by a rear suspension system. The carriage assembly 48 includes a pair of guide rails 52 that carry a plurality of lower idler rollers 56 and a main rear idler roller 60. The guide rails 52 and idler rollers 56 and 60 cooperate to form a path around which a drive track 64 is trained. A drive roller 68 drives the drive track 64 of the engine through a suitable transmission (e.g., a variable belt-type transmission) as is well known in the art.

In the illustrated embodiment, the carriage assembly 48 is suspended relative to the body 12 by a front suspension system and a rear suspension system. The front and rear suspension systems and are coupled to the guide rails 52 on one side and to the vehicle frame on the other side. The front and rear suspension systems of the snowmobile 10 operate in a known manner.

A left ski 76 and a right ski 78 are supported at a forward portion of the body 12 by a set of suspension strut assemblies 82. The suspension strut assemblies 82 accommodate steering movement of the skis 76, 78.

Figure 4:
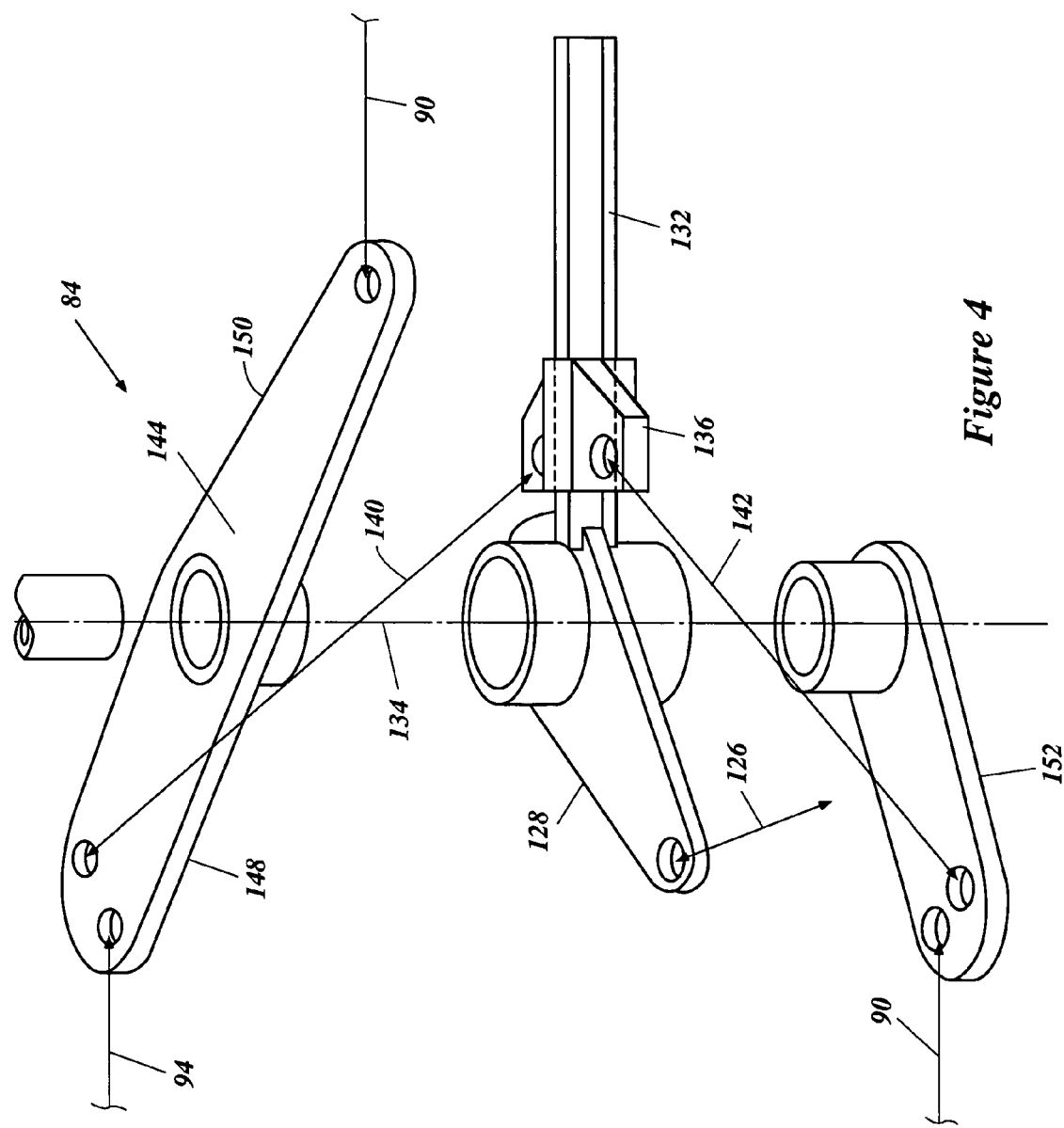
FIG. 4 is an enlarged exploded view of a portion of a steering mechanism used with the adjustable ski-track mechanism of FIG. 1.
Figure 5:
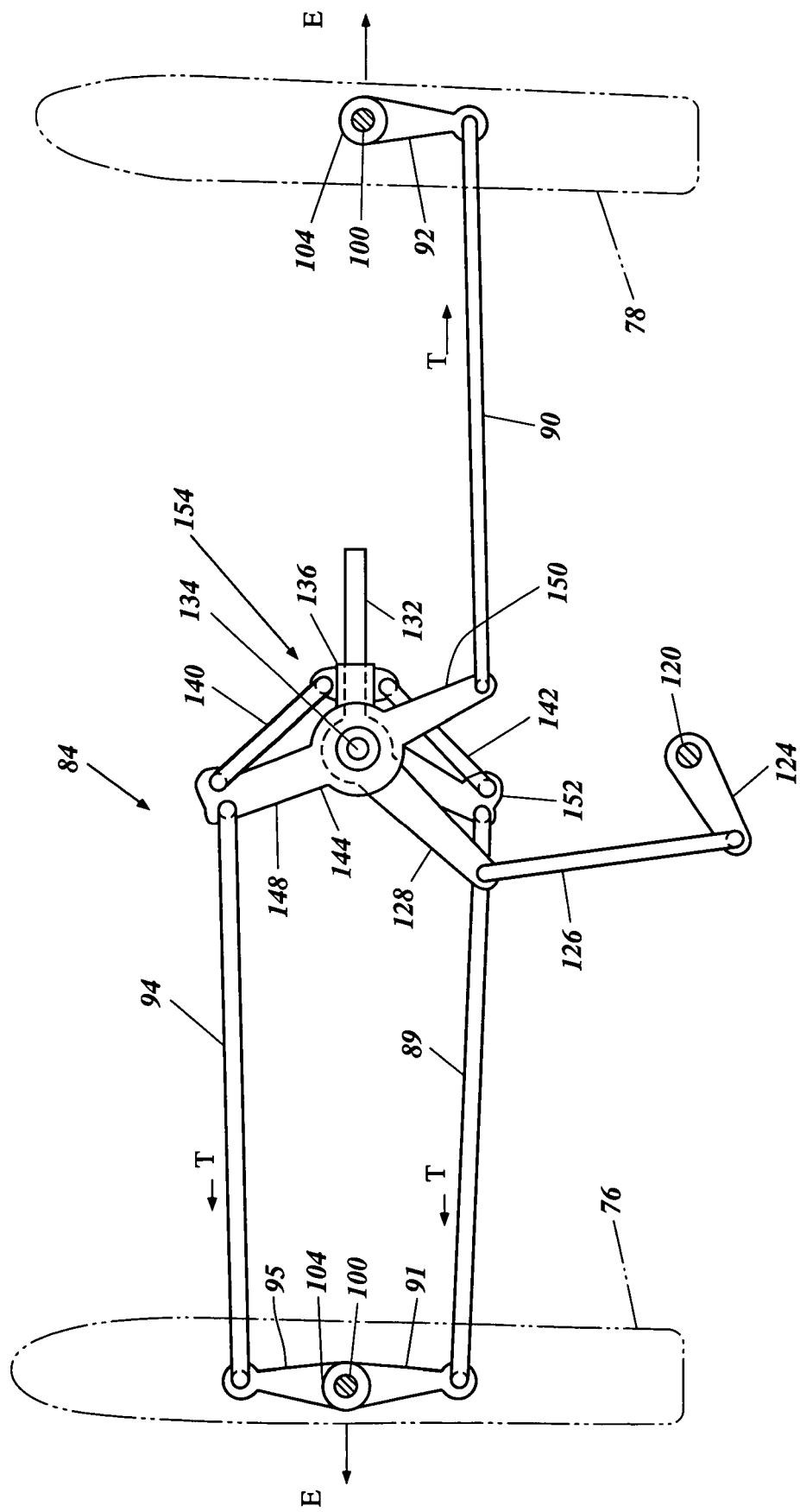
FIG. 5 is a top plan view of the steering mechanism with the skis positioned in a wide track mode as established by the adjustable ski-track mechanism.
Figure 6:
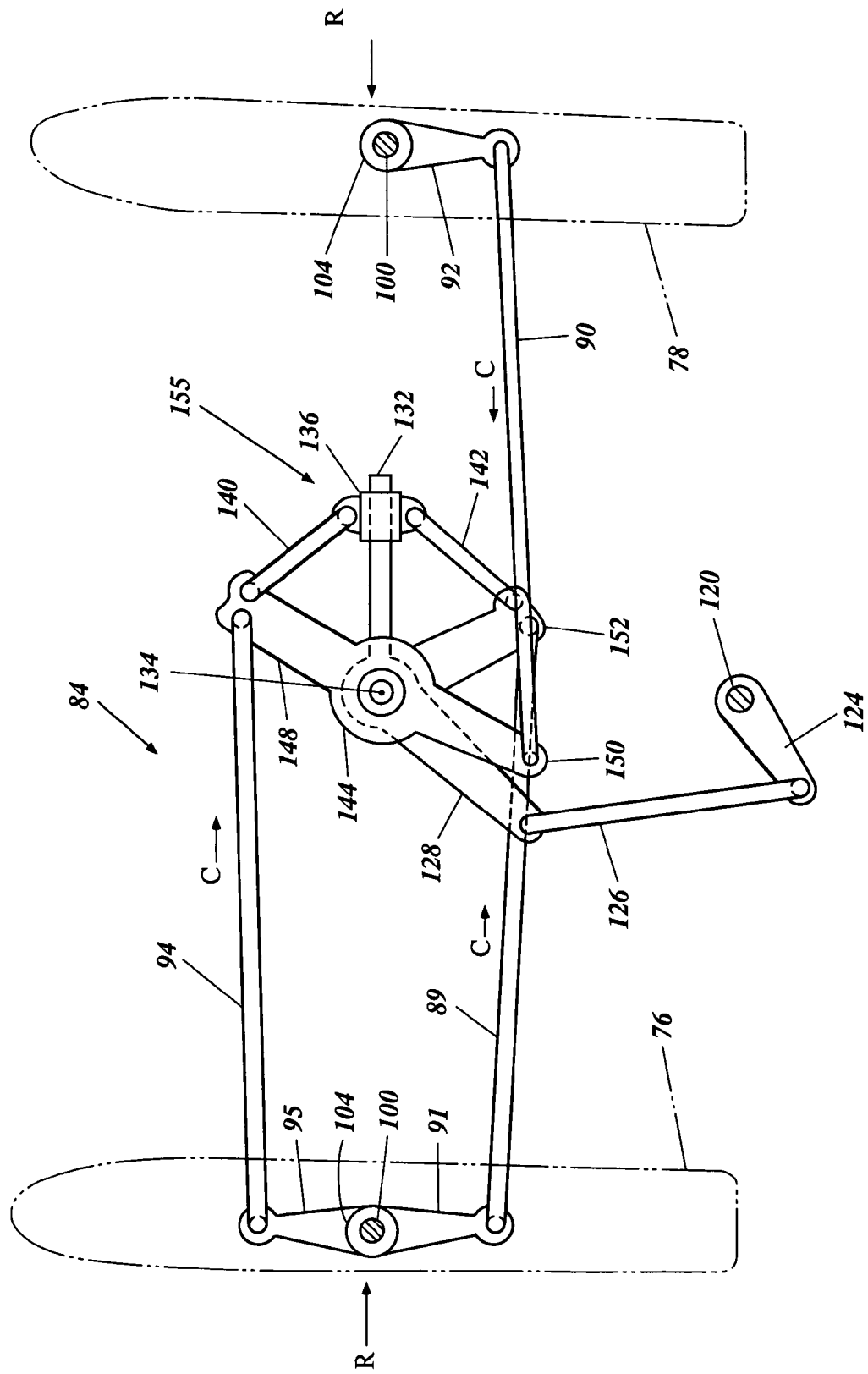
FIG. 6 is a top plan view of a steering mechanism with the skis in a narrow track mode as established by the adjustable ski-track mechanism.
Figure 7:
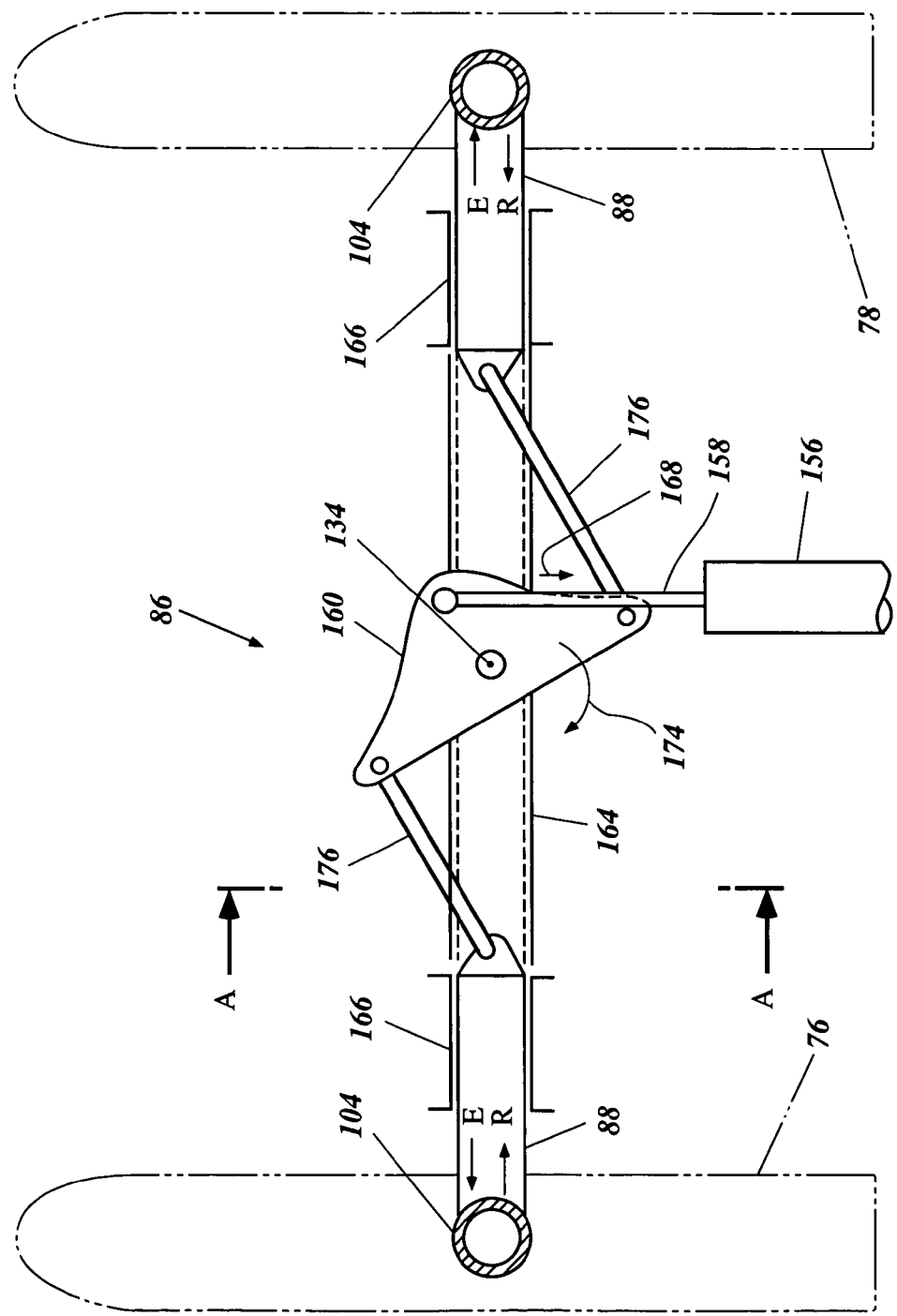
FIG. 7 is a top plan view of the adjustable ski-track mechanism with the skis shown in phantom.

FIGS. 4 through 6 show an embodiment of a steering mechanism 84 that provides steering control of the skis 76, 78 regardless of a position of an adjustable ski track mechanism 86 (FIG. 7). The adjustable ski track mechanism 86 adjusts the track width of the skis 76, 78 according to the control of the operator. The adjustable ski track mechanism 86 is explained in greater detail below with reference to FIGS. 7 and 8.

With reference to FIGS. 3 and 7, the strut assemblies 82 are interconnected through adjustable suspension arms 88. With reference to FIGS. 5 and 6, the steering mechanism 84 controls the axial position of the left ski 76 through a rearward positioned left tie rod 89 and the axial position of the right ski 78 through a rearward positioned right tie rod 90. The left tie rod 89 is connected to the left strut assembly through a left rear steering arm 91. The right tie rod 90 is connected to the right strut assembly through a right rear steering arm 92. The axial position of the left ski 76 is additionally controlled through a forward positioned tie rod 94 that is connected to the left strut assembly through a front steering arm 95. The skis 76, 78 can be steered in unison regardless of the track width of the skis 76, 78. The operation of the steering mechanism 84 according to the position of the adjustable ski track mechanism 86 will be described in greater detail below.

With reference to FIG. 3, each strut assembly 82 includes a hydraulic shock absorber 96 that is fixed to adjustable suspension arms 88 of the snowmobile 10. The shock absorber 96 is aligned with a generally vertically extending steering axis. The shock absorber 96 for each ski 76 also includes a piston 98 that is affixed to a strut shaft 100 which extends into a bore of the shock absorber 96. The piston 98 along with other interior components of the shock absorber 96 can be appropriately valved so as to provide the desired shock absorbing characteristics as is well known in the art.

The strut shaft 100 is connected to each ski 76, 78 at a bottom end of the strut shaft 100 through a ski mounting pivot point 102. The ski mounting pivot point 102 allows the strut shaft 100 to support each ski 76, 78 while permitting the skis 76, 78 to pivot in an attitude changing pitch rotation. The attitude changing pitch rotation of each ski 76, 78 allows the skis 76, 78 to accommodate changing surfaces of the terrain.

The lower end of the shock absorber 96 is affixed to a guide member 104 configured to guide the strut shaft 100 along its reciprocal movement in and out of the shock absorber 96 and preventing unwanted lateral axial movement. The lower end of each strut shaft 100 is connected to the skis 76, 78. Therefore, vertical movement of the skis 76, 78 is directly transmitted to the shock absorber 96.

With continued reference to FIG. 3, each strut assembly 82 includes a steering guide 105 comprising an upper link assembly 106 pivotally connected to a lower link assembly 112. In the illustrated embodiment, the upper and lower link assemblies 106, 112 are constructed of parallel plates having apertures at their upper and lower ends. However, the upper and lower link assemblies 106, 112, can optionally be constructed with one or more parallel members.

The upper end of the link assembly is pivotally connected to the guide 104 with a pivot pin 108. The lower end of the upper link assembly 106 is pivotally connected to the lower link assembly 112 with a pivot pin 114. The lower end of the lower link assembly 112 is pivotally connected with the lower end of the strut shaft 100 through a pivot pin 116. The pivot pins 108, 114, and 116 have their pivot axes disposed parallel to each other and are positioned at a right angle to the skis 76, 78. The link assemblies 106 and 112 allow the strut shaft 100 to move in an upward and downward motion within the shock absorber 96 while transmitting a force from the tie rods 89, 90, and 94 to rotate the skis 76, 78.

With reference to FIGS. 5 and 6, the steering mechanism 84 is provided for steering the snowmobile 10 by turning the skis 76, 78 about their respective steering axes. The steering mechanism 84 includes the operator-controlled handlebar assembly 40 (FIG. 1) that is affixed to rotate a steering column 120 that is rotatably supported by the frame of the snowmobile 10. At the lower end of the steering column 120, there is affixed a pitman arm 124 (FIG. 5) that extends radially from the steering column 120 and is pivotally connected to a drag link 126.

The drag link 126 transfers the movement of the pitman arm 124 to an idler arm 128 that is connected to a steering lever 132.

The idler arm 128 and the steering lever 132 rotate about a central pivot axis 134. A bracket 136 is slideably disposed on the steering lever 132 such that the bracket 136 can reciprocate along a longitudinal direction of the steering lever 132.

The bracket 136 is pivotally connected to a forward positioned drag link 140 and a rearward positioned drag link 142. The forward drag link 140 is pivotally connected to a forward end 148 of a transfer lever 144. The transfer lever 144 rotates on the central axis 134. The transfer lever 144 is also pivotally connected at the forward end 148 to the forward positioned tie rod 94 so as to translate movement of the transfer lever 144 to the left ski 76. A rearward end 150 of the transfer lever 144 is pivotally connected to the rearward positioned right tie rod 90 that communicates with the right ski 78. Therefore, the movement of the transfer lever 144 is translated simultaneously to the right ski 78 through the rearward end 150 of the transfer lever 144 and to the left ski 76 through the forward end 148 of the transfer lever 144.

The rearward drag link 142 is pivotally connected to a transfer lever 152. The transfer lever 152 rotates on the central axis 134. The transfer lever 152 is also pivotally connected to the rearward positioned left tie rod 89 that communicates with the left ski 76. Therefore, the movement of the transfer levers 144 and 152 is translated to the left ski 76 and the right ski 78 respectfully when the steering lever 132 communicates a steering movement to the bracket 136 regardless of the position of the bracket 136 along the steering lever 132.

The bracket 136 transmits the movement of the steering lever 132 to the forwardly positioned drag link 140 and the rearwardly positioned drag link 142. Movement of the adjustable ski track mechanism 86 causes the bracket 136 to slide along the steering shaft 132. Thus, regardless of the position of the adjustable ski track mechanism 86, the bracket 136 transmits the steering movement to the drag links 140, 142.

When the snowmobile 10 is travelling along level terrain and a steering input is delivered by the operator to the steering column 120 by turning the handlebar assembly 40, the pitman arm 124 will rotate in the appropriate direction. Rotation of the pitman arm 124 is transmitted through the respective tie rods 89, 90, 94 to rotate the steering arms 91, 92. Since the steering arms 91, 92 are supported by the guide member 104 for axial rotation, the respective pivot pins 108 (FIG. 3) and link assemblies 105 will also rotate, thereby pivoting the skis 76, 78 along their respective steering axes.

During the steering movement, the skis 76, 78 can still move upwardly and downwardly relative to the body assembly 12 of the snowmobile 10 if rough terrain surfaces are encountered. The suspension strut assemblies 82 will act in their normal manner and the links 106, 112 and their related pivot points 108, 114, and 116 prevent changes in the steering attitude due to these up and down movements.

FIG. 5 illustrates the steering mechanism 84 in a configuration that reflects the position of the skis 76, 78 in a wide track position. In order to move the skis 76, 78 to an extended wider track position, an extending force E can be applied to the skis 76, 78. When the extension force E is applied to the ski 76, 78, tension T is generated in the tie rods 89, 90, 94, thereby causing the transfer lever 144 to rotate counterclockwise and the transfer lever 152 to rotate clockwise. The transfer levers 144, 152 and the drag links 140, 142 move the bracket 136 inwardly into a position 154 along the steering lever 132 closest to the central pivot axis 134.

The bracket 136, the drag links 140, 142, and the transfer levers 144, 152 communicate the steering movement to the skis 76, 78 when the handlebar 40 is moved.

FIG. 6 illustrates the steering mechanism 84 in a configuration that reflects the position of the skis 76, 78 in a narrow track position. In order to move the skis 76, 78 into a narrow track position, a retraction force R can be applied to the skis 76, 78. When the retraction force R is applied to the skis 76, 78, a compressive force C is generated in the tie rods 89, 90, and 94, thereby causing the transfer lever 144 to rotate clockwise and the lever 152 to rotate counterclockwise. The transfer levers 144, 152 and the drag links 140, 142 move the bracket 136 into a position 155 along the steering lever 132 farthest from the central pivot axis 134.

The bracket 136, the drag links 140, 142, and the transfer levers 144, 152 communicate a steering movement to the skis 76, 78 when the steering lever 132 is moved through the idler arm 128, the drag link 126, and the pitman arm 124. The pitman arm 124 receives the steering movement directly through the steering column 120 that is connected to the handlebar assembly 40.

Therefore, the configuration of the drag links 140, 142 and the transfer levers 144, 152 of the steering mechanism 84 change the position of the bracket 136, which allows the steering lever 132 to communicate a steering motion to the skis 76, 78 regardless of ski track width.

FIG. 7 illustrates the adjustable ski track mechanism 86 which represents one type of mechanism that can be used to apply extension and retraction forces E, R, to the skis 76, 78. The adjustable ski track mechanism 86 can be configured to be manually adjusted by the snowmobile operator or automatically adjusted. FIG. 7 illustrates one embodiment of the adjustable ski track mechanism 86 that utilizes a cylinder mechanism 156 to position a piston rod 158. The piston rod 158 transfers movement from the cylinder mechanism 156 to a transfer arm 160.

The transfer arm 160 is rotatably mounted to a support member 164. The support member 164 supports the rotatably mounted transfer arm 160 as well as the adjustable suspension arms 88 through guide members 166. The guide members 166 can be positioned at either end of the support member 164 and allow the adjustable suspension members 88 to move the skis 76, 78 between a narrow track width and a wide track width.

When moving the adjustable ski track mechanism 86 from the wide ski track position to the narrow ski track position, the cylinder mechanism 156 can move the piston rod 158 in a direction identified by a reference number 168. This movement of the piston rod 158 is transferred to the transfer arm 160, which causes the transfer arm 160 to rotate about the axis 134 in a direction identified by a reference number 174. The rotating movement 174 of the transfer arm 160 causes the adjustable suspension arms 88 to apply a retraction forces to the skis, 76, 78, thereby moving the skis 76, 78 to the narrow track configuration.

When the piston rod 158 is moved in a direction opposite of the illustrated piston rod direction 168, the transfer arm 160 rotates opposite the illustrated transfer arm direction 174. This rotation of the transfer arm 160 moves the adjustable suspension arms 88 through the link members 176, thereby apply the extension force E to move the skis 76, 78 into the wide track configuration.

Figure 8:
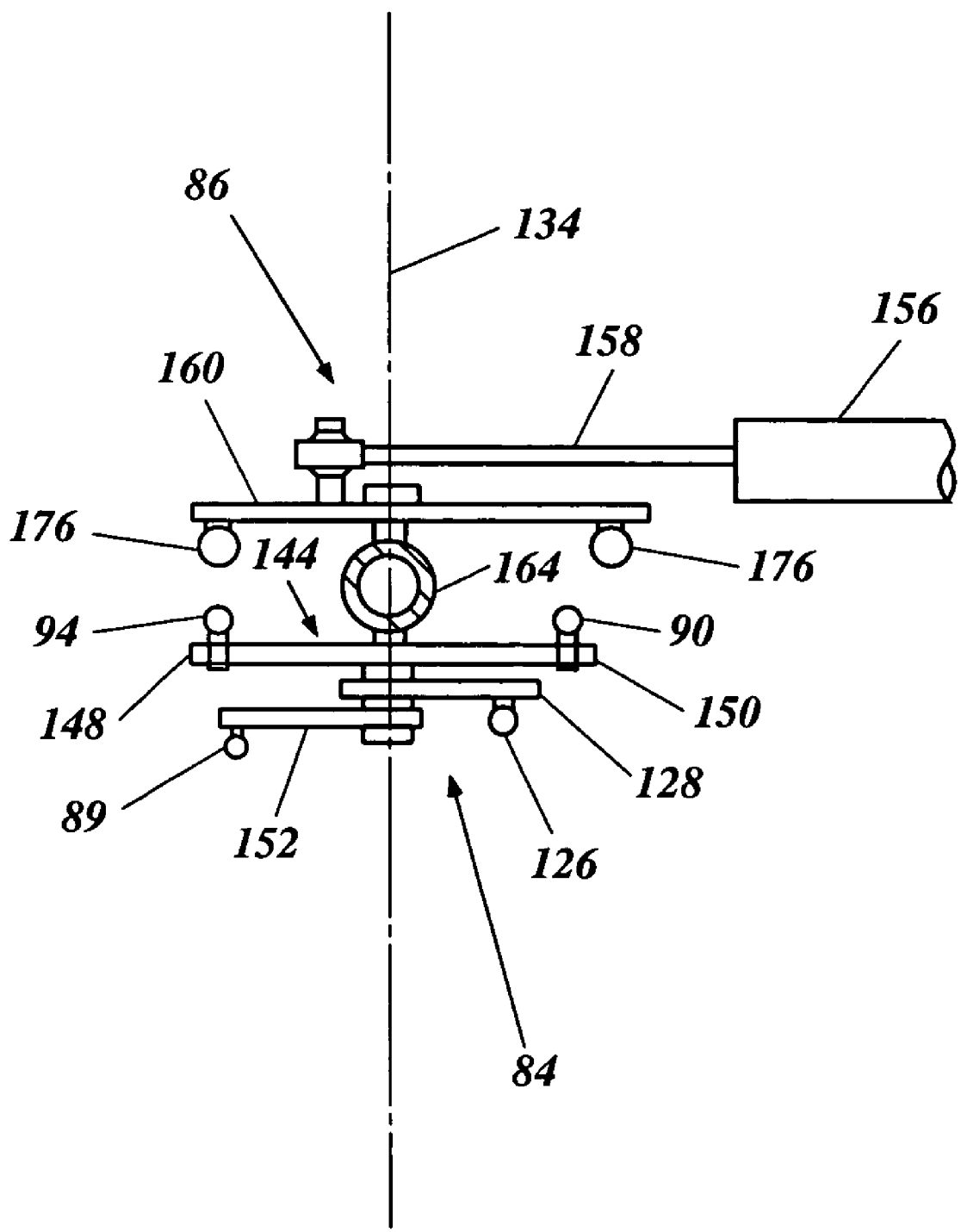
FIG. 8 is a cross-sectional view of the adjustable ski-track mechanism taken along the line A—A of FIG. 7 showing the adjustable ski track mechanism disposed about the steering mechanism.

FIG. 8 illustrates a cross sectional view of the steering mechanism 84 and the adjustable ski track mechanism 86 taken along the line A—A in FIG. 7. In the illustrated embodiment, the adjustable ski track mechanism 86 is located above the support member 164, whereas the steering mechanism 84 is located below the support member 164. The transfer arm 160 of the adjustable ski track mechanism 86 as well as the transfer lever 144, the idler arm 128, and the transfer lever 152 of the steering mechanism all rotate independently on the central pivot axis 134. The movement of the cylinder mechanism 156 causes the skis 76, 78 to be adjusted between a wide ski track (FIG. 5) and a narrow ski track (FIG. 6). The change in ski track width causes the steering mechanism 84 to adjust a steering geometry to allow steering control of the skis 76, 78 regardless of ski track width.

The adjustable ski track mechanism 86 can adjust the track of the skis 76, 78 between a wide ski track width offering increased leaning resistance and a narrow ski track width offering more agile steering operation of the snowmobile 10. The wide ski track width can be advantageous for long distance trail riding or while carrying a passenger. The narrow ski track width can be advantageous for exhilarating track riding or deep snow operation. The adjustable ski track mechanism 86 can be adjusted according to operator preference.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In particular, while the present snowmobile steering device has been described in the context of particular embodiments, the skilled artisan will appreciate, in view of the present disclosure, that certain advantages, features and aspects of the device may be realized in a variety of other applications, many of which have been noted above. For example, while particularly useful for adjusting the steering track of the snowmobile, the skilled artisan can readily adopt the principles and advantages described herein to a variety of other applications. Several aspects of the invention can also be used with snowmobile steering systems having other configurations than that described above. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A vehicle comprising two support members being spaced apart from each other so as to define a track width between the support members, an adjustable support member mechanism comprising at least one adjustable suspension arm coupled to each support member and a rotational transfer arm that pivots about a central portion of the transfer arm, each support member including a shock absorber assembly and each adjustable suspension arm being coupled to the corresponding shock absorber assembly, each end of the transfer arm being pivotally linked to one of the adjustable suspension arms, the adjustable support member mechanism being movable between at least first and second positions so as to change the track width, thereby establishing a first track position and a second track position, respectively, the first track position defining a first distance between the two support members and the second track position defining a second distance between the two support members, the first distance being smaller than the second distance, a steering input device, and a steering mechanism arranged between the input device and the support members to change direction of the support members according to a position of the steering input device at least when the support members are in the first track position and when the support members are in the second track position.

2. The vehicle of claim 1, wherein the rotational transfer arm transfers an input motion to change the support member track width.

3. The vehicle of claim 2 additionally comprising a cylinder mechanism connected to the rotational transfer arm to provide said input motion.

4. The vehicle of claim 3, wherein the cylinder mechanism is configured to be manually operated.

5. The vehicle of claim 2, wherein the steering mechanism includes at least one member that rotates about the same axis about which the rotational transfer arm rotates.

6. The vehicle of claim 5, wherein the steering mechanism includes a steering lever that rotates about the rotational axis of the rotational transfer arm.

7. The vehicle of claim 1, wherein the operator input device is a handle bar.

8. The vehicle of claim 1, wherein the adjustable support member mechanism is configured to move the support members relative to a centerline of the vehicle.

9. The vehicle of claim 1, wherein the support members are steering skis.

10. The vehicle of claim 1, wherein the steering mechanism includes an idler arm that transfers motion from a pitman arm to a steering lever.

11. The vehicle of claim 10, wherein the steering lever transfers motion to a slideable bracket that is movable along the steering lever.

12. The vehicle of claim 11, wherein the slideable bracket and the steering arm are configured in a manner allowing the slideable bracket to transfer motion of the steering lever to at least one transfer arm regardless of the position of the slideable bracket on the steering lever.

13. The vehicle of claim 12, wherein the slideable bracket and the steering arm are arranged such that the position of the slideable bracket changes a steering linkage geometry at least when the adjustable support member mechanism moves between the first and second positions.

14. The vehicle of claim 12, wherein the idler arm, the steering lever, and the at least one transfer arm all rotate independently of each other on a common axis.

15. A snowmobile vehicle comprising two skis being spaced apart from each other so as to define a track width between the skis, and an adjustable ski-track mechanism coupled to the skis and movable between at least first and second positions so as to change the track width, thereby establishing a first track position and a second track position, respectively, the first track position defining a first distance between the two skis and the second track position defining a second distance between the two skis, the adjustable ski-track mechanism including an input mechanism to change the track width between the skis, the input mechanism comprising a rotational transfer arm that is coupled to both skis and that pivots about a central portion of the transfer arm, and a cylinder mechanism connected to the rotational transfer arm.

16. The vehicle of claim 15, wherein the rotational transfer arm transfers an input motion to change the track width between the skis.

17. The vehicle of claim 16, wherein the cylinder mechanism provides said input motion.

18. The vehicle of claim 15, wherein the cylinder mechanism is configured to be manually operated.

* * * * *